United States Patent
Morton et al.

(10) Patent No.: US 7,979,318 B1
(45) Date of Patent: Jul. 12, 2011

(54) METHOD, SYSTEM AND SOFTWARE PRODUCT FOR CREATING VARIABLE PRICING

(75) Inventors: Richard J. Morton, Oshkosh, WI (US);
Kevin Lyons-Tarr, Neenah, WI (US)

(73) Assignee: 4Imprint, Inc., Oshkosh, WI (US)

( * ) Notice: Subject to any disclaimer, the term of this patent is extended or adjusted under 35 U.S.C. 154(b) by 0 days.

(21) Appl. No.: 12/422,748

(22) Filed: Apr. 13, 2009

Related U.S. Application Data

(60) Provisional application No. 61/044,161, filed on Apr. 11, 2008.

(51) Int. Cl.
*G06Q 30/00* (2006.01)
(52) U.S. Cl. ..................... 705/26.1
(58) Field of Classification Search ............ 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | |
|---|---|---|---|
| 6,061,691 A * | 5/2000 | Fox | 1/1 |
| 6,101,484 A * | 8/2000 | Halbert et al. | 705/26 |
| 6,988,076 B2 * | 1/2006 | Ouimet | 705/7.36 |
| 7,062,447 B1 * | 6/2006 | Valentine et al. | 705/1.1 |
| 7,523,047 B1 * | 4/2009 | Neal et al. | 705/10 |
| 7,593,871 B1 * | 9/2009 | Mesaros | 705/26 |

OTHER PUBLICATIONS

Rajeev Kohli et al. "A Cooperative Game Theory Model of Quantity Discounts", Management Science, vol. 35, No. 6, Jun. 1999 (pp. 693-707).*
Smith, Gerald E. "Leveraging profitability in low-margin markets", Journal of Product & Brand Management, 2006, v15n6 pp. 358-366. Retrieved from Dialog File: 15, Acc#: 03277756.*

* cited by examiner

*Primary Examiner* — Naeem Haq
(74) *Attorney, Agent, or Firm* — Joseph S. Heino; Patrick M. Bergin

(57) ABSTRACT

A method, system and software product allows the seller of products or services to offer variable pricing while still basing that pricing on the quantity selected by a buyer. It also provides the seller with the ability to adjust the per unit price of any given product or service along a calculated adjustment curve that would exist between price breaks. Two values need to be stored for each plot point on the adjustment curve, the "quantity percentile" and the "price percentile." To calculate the quantity percentile, the seller determines the difference in quantities between the start price break and the end price break for the specific adjustment curve that is being plotted. The "price percentile" represents the amount of the difference between the start and end price break that will be used to discount the start price breaks price at the quantity level that was calculated in the quantity percentile.

12 Claims, 7 Drawing Sheets

——— SELLING PRICE   ----- OFFICIAL PRICE BREAKS

WRITING > PENS > #100970-CL

COUGAR PEN
DON'T WAIT TO TAKE ADVANTAGE OF
THIS GREAT CLEARANCE PRICE!

CHOOSE COLOR

BARREL/GRIP
BLACK
RED
ORANGE
YELLOW
LIME
BLUE

SELECTED COLORS
: BARREL/GRIP

ENTER QUANTITY

| MIN QTY | 500 | 1000 | 2500 | 5000 | 10000 |
|---|---|---|---|---|---|
| REGULAR PRICE | 49¢ | 45¢ | 43¢ | 41¢ | 38¢ |
| SALE PRICE | 29¢ | 24¢ | 22¢ | 20¢ | 18¢ |

QUANTITY    NEXT

NEED DIFFERENT QUANTITIES?

FIG. 7

METHOD, SYSTEM AND SOFTWARE PRODUCT FOR CREATING VARIABLE PRICING

This application claims the benefit and priority of U.S. Provisional Patent Application No. 61/044,161 filed Apr. 11, 2008.

FIELD OF THE INVENTION

This invention relates generally to the marketing and selling of products and services. It also relates generally to web-based (i.e. utilized by means of the virtual community that exists within the "world wide web," or "www") methods and systems for acquiring, storing, processing, retrieving and displaying information and data. More specifically, it relates to a method, software product and system for variably pricing products and services.

BACKGROUND OF THE INVENTION

Many products and services that are sold today are sold on the basis of "fixed quantities." That is, the seller offers to sell certain products with the pricing for such products being based on certain "fixed quantities" that are presented to the buyer as well as on certain "price breaks" that are then based on those fixed quantities. Selling products in this fashion typically requires that the seller calculate decreasing product prices on a "per unit" basis at somewhere between three to seven different quantity levels. While this type of "quantity/price break" combination can be viewed as an incentive for encouraging the buyer to purchase more product, the reality is that this type of sales methodology has become the norm in printed sales catalogs simply because there is only so much physical space that can be allocated on a printed catalog page for the pricing information that is available for any given product.

There is, however, a fundamental unfairness (certainly as viewed by the buyer) that is created in the use of such pricing structures. By way of example, suppose that a seller of promotional items, such items bearing a business name or logo and being distributed to end users for promotional purposes, offers ball point pens for sale. Suppose also that such ball point pens are being offered to the buyer at a per unit price of 29¢ for a minimum quantity order of 500 pens. Suppose then that the next "quantity/price break" occurs at the point where the buyer would purchase 1,000 pens, in which case the price for each pen purchased above that number is reduced to a per unit price of 24¢. In this example, a first buyer that orders 900 pens will pay the same price as a second buyer that orders the minimum quantity of 500 pens. In this particular situation, the wise first buyer should realize (but may not) that it will actually pay less total cost for 1,000 pens, i.e. $240, than it would for 900 pens, i.e. $261. In this example, the first buyer is actually better off ordering 1,000 pens in any situation where it could or would need to purchase more than 827 pens. But perhaps that first buyer just doesn't need 1,000 pens, but definitely needs more than 827 pens. In short, the "quantity/price break" methodology is not fair to the buyer in some situations and may not be attractive to the buyer in other situations.

In the view of these inventors, what is needed is a method and system for variably pricing products and services that would effectively eliminate this conventional type of "quantity/price break" methodology. In this age of electronic data processing and communications, the internet provides sellers with promotional opportunities and benefits not previously made possible. This is particularly true for sellers who, up to now, have sold products and services only through catalogs. This electronic medium makes the method and system of the present invention possible. The present invention is also made possible by the use of specialized software that will calculate specific pricing structures for specific goods and in quantities that will prove to be much more flexible than current methods allow for.

SUMMARY OF THE INVENTION

In accordance with the foregoing, these inventors have perceived a need to provide such a method and system that allows for the seller to offer "truly variable pricing" but which is still based on the quantity selected by the buyer. The method and system of the present invention provides the seller with the ability to adjust the "per unit" price of any given product along a calculated line that would exist between price breaks, much like the curve in a line chart. A computer program product, comprising a computer readable medium, has the computer executable instructions encoded on the medium for carrying out the method of the present invention.

The foregoing and other features of the method and system of the present invention will become apparent from the detailed description that follows.

BRIEF DESCRIPTION OF THE DRAWINGS

FIG. 7 is a screen shot illustrating the standard quantity price break pricing displayed as normal, but with a new "Need different quantities?" option being provided in the screen shot in accordance with the present invention.

DETAILED DESCRIPTION

Figure 1:
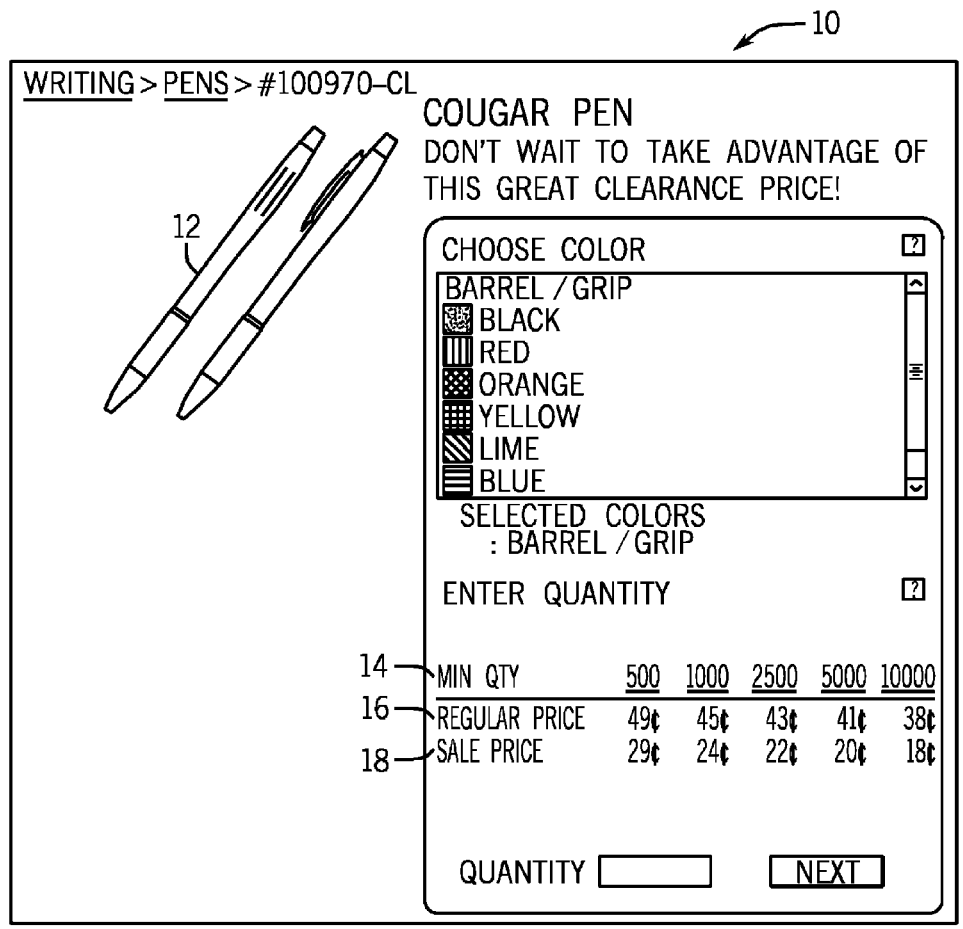
FIG. 1 is an exemplary and annotated data display, or "screen shot," of the type that has been utilized in the prior art and illustrating a set of five "price/quantity" combinations for a product.

As a prefatory statement, it is to be understood that the method and system of the present invention assumes usage of a specific computer program that is used electronically by the seller and the buyer within an electronic commerce (or "e-commerce") environment that comprises certain system building block "components." Those components are data structures, data processors and interfaces, and each component is a functional element. The data structures are places to organize and store data. The data processors, collectively a "controller," are used to manipulate data by performing processes or applying algorithms to the data. The data processors utilize computer readable code and instructions that reside in or on a computer-readable medium. Suitable processors include, for example, both general and special purpose microprocessors.

Further, the present invention is not limited to any particular medium and the medium could correspond to any that permits the storage and/or transmission of computer readable code. The computer-readable code can be recorded or transferred to a medium in a variety of ways, including magnetic storage media, optical recording media and storage and transmission media. The present invention comprises a computer program product for variably pricing goods in an online transaction, the product comprising a computer readable medium and computer program instructions that are encoded on the medium for accomplishing the method of the present invention.

The interfaces mentioned above are used to electronically connect the data structures and the data processors to the outside world, or to other data structures and data processors, including the virtual community that exists within the "world wide web" or "www" on the internet. The interfaces allow for web pages to be displayed and viewed on a display screen or other like electronic device. Specific to the present invention is the ability of the interface to be used in the electronic offering of a product for sale on or over the internet.

As alluded to above, the program includes source code which is a list of instructions, written in a selected computer language, and then converted into computer machine language, which language the computer uses to build the software "machine" described by the instructions. The software machine is made up of the components referred to above. The source code is a detailed "blueprint" telling the computer how to assemble those components into the software machine. Further, the source code is organized into separate files, files are organized into separate modules, and modules are organized into separate functions or routines to accomplish, via pre-programmed algorithms, the necessary steps in accordance with the method and system of the present invention. It will be obvious to one of ordinary skill to use a conventional database management system and operating system as a platform for implementing the present invention.

It is also to be understood that the specific way that the source code is organized into files, modules and functions is a matter of programmer design choice and is not a limitation of the present invention. Finally, it is to be understood that most of the pages on the website that use the method and system of the present invention can be said to be somewhat similar to pages found on other websites that would offer products or services for sale in various quantities.

It is also to be understood that a "product," as that term is used in this application, is considered any good or service having a price component associated with it. The type of product can be any seller-originating product and the present invention is not limited to any particular product or type of product. Further, the present invention is not limited to any type of customer attribute and the method and system of the present invention, together with the pricing engine discussed in this detailed description may be customized to meet the needs of any product seller or customer.

Referring now to the detailed drawings, wherein like numbered elements represent like elements throughout, FIG. 1 shows a typical screen display, generally identified (10), as it would be viewed by the buyer of a certain product. The screen display (10) identifies the specific product (12) and the different quantities (14) that the product (12) can be purchased in. In this example, the product (12) is a ball point pen that is available in "fixed quantities" of 500, 1,000, 2,500, 5,000 and 10,000 units (14). Each of those fixed quantity amounts (14) has an associated "regular price" (16) and an associated "sale price" (18). It is to be understood that the variations of this type of product, together with the quantities and prices illustrated, are for purposes of example only and are in no way a limitation of the present invention. This example is one that was made earlier in this specification disclosure and it illustrates the point that a customer ordering 900 units of this particular product (12) at a cost of 29¢ per unit will pay the same price per unit as a customer ordering a minimum of 500 units. Although the customer is close to the next available fixed quantity, which, if reached, would result in a significant per unit savings on this particular product (12), that price reduction is not available with the options provided to the customer in accordance with this particular screen display (10) and in accordance with the prior art in general.

It should be mentioned that the method and system of the present invention is made possible by virtue of the existence of the internet. The internet offers opportunities and benefits that cannot be performed with the use of printed product catalogs. The "pricing engine" software program, method and system that is the subject of the present invention will enable users (as viewed from the sellers' side) to offer truly variable pricing to other users or customers (as viewed from the buyers' side) based on the quantity selected by the customer. The price per unit will adjust along a calculated line between the price breaks, much like the curve in a line chart.

Figure 2:
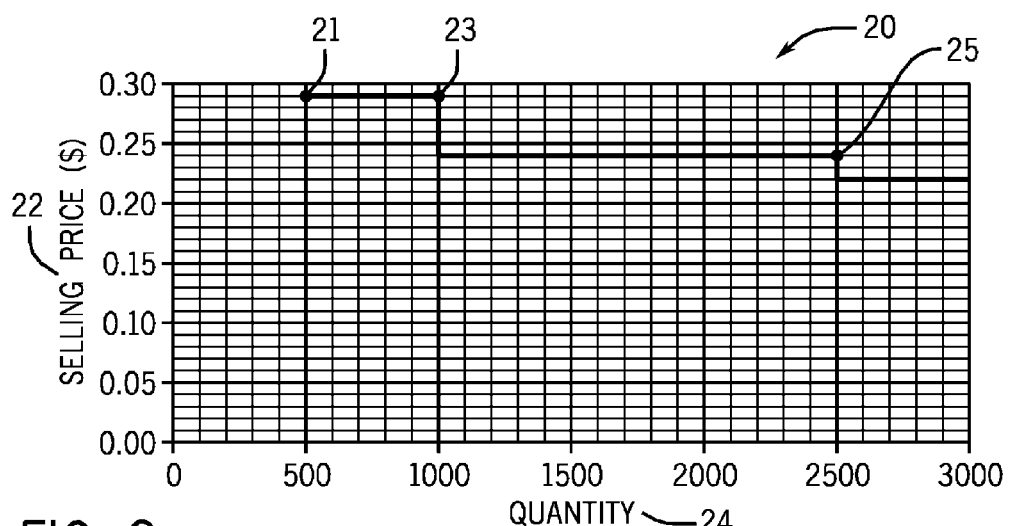
FIG. 2 is a chart illustrating traditional pricing in accordance with the "price/quantity" methodology of the prior art and showing "stepped" pricing between price breaks.
Figure 3:
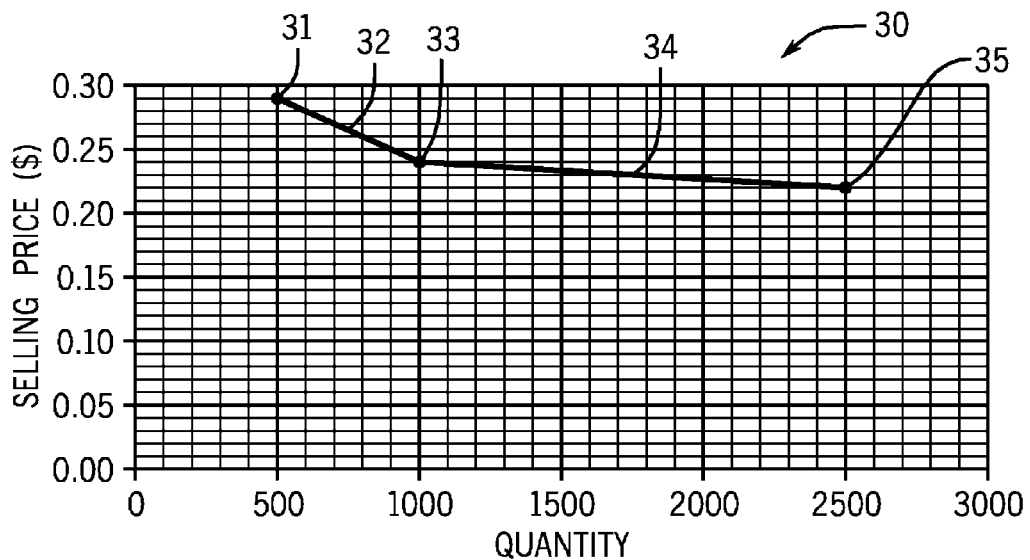
FIG. 3 is a chart illustrating product pricing that would use a "sliding" price between price breaks in accordance with the present invention.

Referring now to FIG. 2, it shows a graph (20) that illustrates a traditional "stepped" pricing model in accordance with the prior art. It shows the "per unit" selling price (22) as compared to the quantity ordered (24) and illustrates price breaks at 1,000 units (23) and 2,500 units (25), the minimum order amount being set at a quantity of 500 units (21). Again, this graph (20) is presented only for purposes of general explanation of the concept presented and is in no way a limitation of the present invention. By comparing the graph (20) of FIG. 2 with the graph (30) of FIG. 3, it will be seen that the graph (30) of FIG. 3 illustrates the "default mapping" of prices between price breaks of 500 units (31), 1,000 units (33) and 2,500 units (35) as a number of straight lines (32) (34). These lines (32) (34) may be considered to be "sliding" price lines between the price breaks. Using this graph (30) in the case of ordering pens, for example, a customer ordering 700 pens would pay a per unit price of about 27¢ leading to a total order amount of $189 versus a price of 29¢ and a total order amount of $203 using the pricing model of the prior art in accordance with the graph (20) of FIG. 2.

In the method and system of the present invention, the novel "pricing engine" that is computer-implemented allows one to also modify the "curve" that is used. This is accomplished by modifying the underlying computer readable code and instructions as written in a single software application or in several interacting software modules. Reference data and attributes created by the system administrator enable the particular configuration that is to be used by any particular seller for any particular product. For purposes of this detailed description, this type of curve will be termed as an "adjustment curve" in the singular or "adjustment curves" in the plural. The purpose for this is that the seller may wish to offer, for example, a steeper drop at the start of the curve, but then taper off to a somewhat shallower curve towards the higher quantity amounts being sold.

Figure 4:
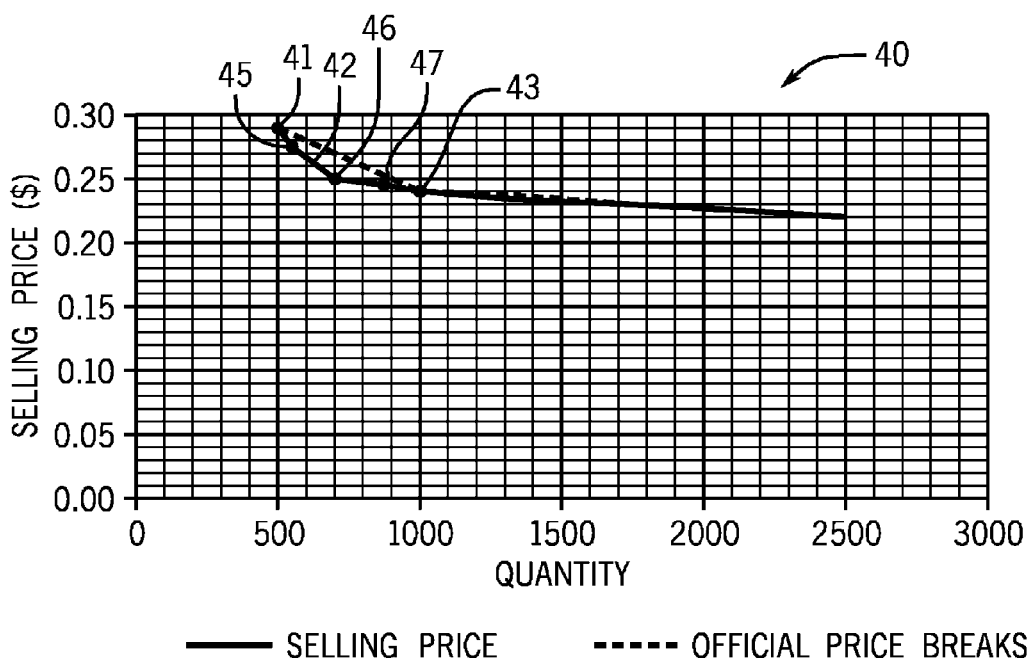
FIG. 4 is another chart illustrating an adjustment curve that has been applied between two price break amounts as illustrated in FIG. 3.

Referring now to FIG. 4, it illustrates a graph (40) that shows an adjustment curve (42) that has been applied between the price breaks of 500 units (41) and 1,000 units (43). The selling price line is now the adjustment curve (42) that is created in accordance with the pricing engine of the method and system of the present invention. By way of example, 700 units of the product would cost 25¢ per unit, leading to a total order amount of $175.

Adjustment curves are essentially plot points between price breaks that define a quantity and price combination. The pricing engine of the present invention would allow from 0 (i.e., no adjustment curve) to 98 plots between each price break. The specific plot points for the adjustment curve (42) illustrated in FIG. 4 would be as follows:

(a) the first price break (41) would be at a quantity of 500 units at a unit price of 29¢;
(b) the first adjustment point (45) would be for the quantity of 550 units at a per unit price of 28¢;
(c) the second adjustment point (46) would be for 700 units at a per unit price of 25¢;
(d) the third adjustment point (47) would be for 875 units at a per unit price of 25¢; and
(e) the second price break (43) would be at the 1,000 unit quantity as shown with a per unit of 24¢.

Figure 5:
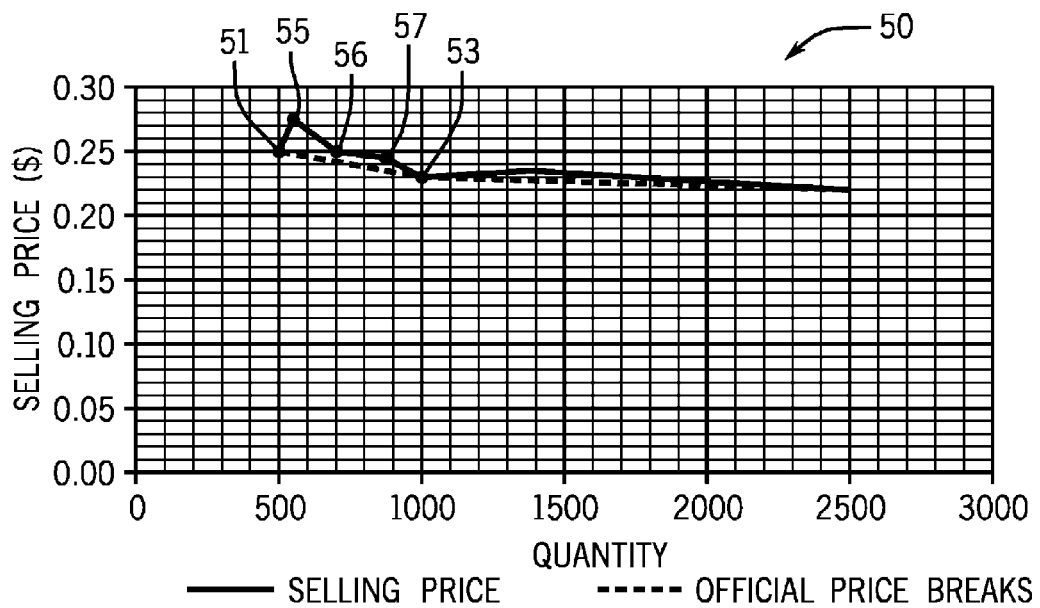
FIG. 5 is another chart illustrating the product pricing as each price break has been adjusted.

However, storing the plot points as actual quantity and price values is not scalable from an administrative point of view because, if the quantity and/or price changes in any of the price breaks, then the line that is plotted along the adjustment curve will change as well. This effect is illustrated in FIG. 5 which is a graph (50) that illustrates the pricing at each price break that has been adjusted. In the example shown in FIG. 5, it should be noted that the prices stored for the first price break (51) and the second price break (53) have been changed from 29¢ and 24¢ to 25¢ and 23¢, respectively. As will be seen, because the adjustment plot points (55) (56) (57) have been stored as actual values, 700 pens would now cost more per unit than 500 pens and more than the calculated price would be if the adjustment curve had not been set. Obviously, this is not an acceptable solution. The solution is, instead, to store adjustment plot points as "percentiles."

In the method and system of the present invention, there are two values that need to be stored for each plot point. Those are the "quantity percentile" and the "price percentile." The "quantity percentile" represents how far along the quantity line between the start and end break the seller decides to go. To calculate the quantity percentile, the seller needs to work out the difference in quantities between the start price break and the end price break for the specific adjustment curve that is being plotted. In the example above as illustrated in FIG. 4, this would be the first price break (41) at 500 units and the second price break (43) at 1,000 units, thus leading to a quantity difference of 500 units. The quantity percentile represents how much of those 500 units are being used. Thus, a "twenty percent" quantity would represent twenty percent of 500 units, or 100 units. Twenty percent is stored as the plot point in the data base.

The "price percentile" represents the amount of the difference between the start and end price break that will be used to discount the start price breaks price at the quantity level that was calculated in the quantity percentile. In accordance with the present invention, the seller will first need to calculate the difference in price between the start price break and the end price break for the adjustment curve that is being plotted. In the example shown above, these are the first and second price breaks (41) (43) and there is a difference in price of 5¢. The percentage value indicates how much of that 5¢ will be discounted or we will want to discount the quantity by. Thus, a value of twenty percent would represent a discount of 1¢ off the opening per unit price of 29¢.

If the original amounts are taken as the reference point, then the real values that would be stored for the adjustment curve would be as follows:

(a) the first price break (41) would be at a quantity of 500 units at a per unit price of 29¢;
(b) the first adjustment point would be a quantity percentile of 10% and a price percentile of 30%;
(c) the second adjustment point would be a quantity percentile of 40% and a price percentile of 80%;
(d) the third adjustment point would be a quantity percentile of 75% and a price percentile of 90%; and
(e) the second price break (43) would be at the 1,000 unit quantity with a per unit price of 24¢.

Figure 6:
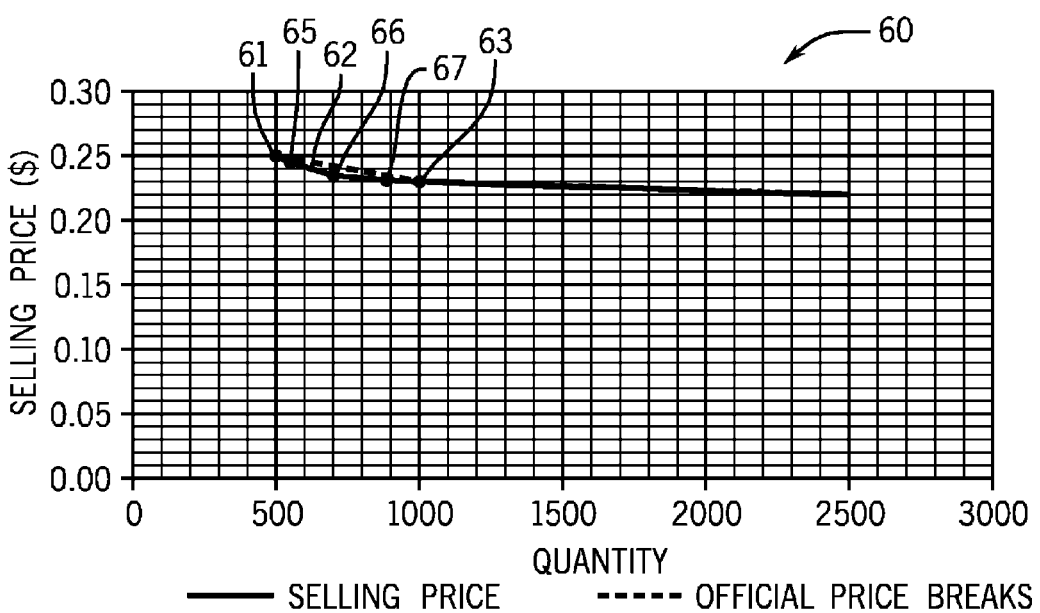
FIG. 6 is another chart illustrating the product pricing and illustrating that the price breaks between two product amounts have been lowered with the adjustment curve being automatically recalculated.

As long as the plot points for the adjustment curves are stored as percentile values, then, if one were to adjust either quantities or prices of the official price breaks, the adjustment curve will automatically "refresh" based on percentages of the new values. Using the information from FIG. 5, where the first and second price breaks (51) (53) were adjusted, the new adjustment curve (62) would now look like that illustrated in the graph (60) shown in FIG. 6. FIG. 6 illustrates that the pricing associated with the first price break (61) and the second price break (63) have been lowered. The adjustment curve (62) has automatically been recalculated as well. As will be seen, the adjustment curve (62) has automatically followed the adjusted pricing (65) (66) (67) between the first and second price breaks (61) (63) and now the price for 700 units is 23¢ per unit. This is a rounded amount.

Storing the adjustment curve plot points as percentiles obviously means that the formula for pricing is more extensive than that used in the prior art and covers many steps. Another example where the full formula can be demonstrated is as follows. For example, it is assumed that the seller has a product for sale on its website, which product has the following price breaks:

| Qty: | 72 | 144 | 288 | 576 | 1008 |
|---|---|---|---|---|---|
| Price: | 2.39 | 1.65 | 1.55 | 1.48 | 1.41 |

It is also assumed that the adjustment curves for this product are as follows:

| | Adjustment Curve No: | | | |
|---|---|---|---|---|
| | AC1 (applies between 72-144) | AC2 (applies between 144-288) | AC3 (applies between 288-576) | AC4 (applies between 576-1008) |
| | Qty % / PRICE % | Qty % / PRICE % | Qty % / PRICE % | Qty % / PRICE % |
| Start Point: | 10 / 25 | 2 / 10 | 15 / 20 | 5 / 1 |
| End Point: | 70 / 68 | 90 / 95 | 80 / 85 | 80 / 80 |

To calculate the price of 100 units, the pricing engine looks to see which official price breaks the requested quantity falls between. Here, it would fall between the quantities 72 and 144. It then checks to see if an adjustment curve has been set up (as these are optional) and, if it has, then there are the additional steps 1 through 4 below before pricing can be calculated.

Step 1—work out the actual quantity value for Adjustment Curve No. 1's (AC1's) Start Point Qty % Value:

$$AC1SPQ = \left(\frac{Q2 - Q1}{100}\right) * AC1SPQTYPCNT + Q1$$

or $$AC1SPQ = \left(\frac{144 - 72}{100}\right) * 10 + Q1$$

AC1SPQ=79.2

This tells us that 10% along the quantity line between the quantity breaks 72 and 144 is 79.2 units.

Step 2—we need to use the same formula to work out the actual quantity for AC1's end point Qty %

$$AC1EPQ = \left(\frac{144 - 72}{100}\right) * 70 + Q1$$

AC1EPQ=122.4

The pricing engine then needs to calculate the actual price value for each of those adjusted quantity points based on the PRICE % recorded.

Step 3—work out the actual price for AC1SPQ $$AC1SPP = P1 - \left(\left(\frac{P1 - P2}{100}\right) * AC1SPPRICEPCNT\right)$$

or $$AC1SPP = 2.39\left(\left(\frac{2.39 - 1.94}{100}\right) * 25\right)$$

AC1SPP=2.2775

Step 4—work out the actual price for AC1EPQ $$AC1EPP = 2.39\left(\left(\frac{2.39 - 1.94}{100}\right) * 68\right)$$

AC1 EPP=2.084

Now that we have established the actual values for the percentiles stored, we can calculate the adjusted price. It is important to note that the pricing engine looks at the requested quantity and identifies which of the quantities and prices to use in the calculation. In our example of 100, the lower qty/price combination is 79.2×@ $2.2775 from the AC1's start point and the upper qty/price combination is 122.4×@ $2.084 from the AC1's end point. If we had requested a price for 136 units, then the start qty/price would have been adjustment curve 1 end point (122.4×@ $2.084) and the end qty/price would have come from official price break 2 (144×@ $1.94)

Step 5—calculate the price (using same formula from first example)

$$PRICE = 2.2775 - \left(\left(\frac{2.2775 - 2.084}{100}\right) * \left(\frac{(100 - 79.2)}{\left(\frac{122.4 - 79.2}{100}\right)}\right)\right)$$

PRICE=2.1843334

When truncated to two decimals (we truncate rather than round) we find the price with adjustment curves for 100 units is $2.18. Had we not set up adjustment curves for this product, then the price would have been $2.21.

In accordance with the method and system of the present invention, there are other calculation rules. Because it is contemplated that the seller would be selling in complete units, cents (or pennies, pfennigs or other units of currency), the calculated price per unit will be rounded up or down. The pricing engine of the present invention insures that the calculated price between the opening and closing price breaks never goes below or equal to the end price break. In the example given above, if one were to order 999 units, the calculated pricing, when rounded, would be the same as the next quantity break of 1,000 units. This result could be dealt with by adding 1¢ to the price, thus making the next break cheaper.

To simplify administration further and cut down on the amount of time that is needed to configure and administer the pricing engine for products, the pricing engine will allow the user to create named templates of adjustment curves. One would be able to set up a library of different curves and choose which templates are used with which products or groups of products. Obviously, one can also choose not to apply adjustment curves to specific products or groups of products, in which case the pricing engine of the present invention will calculate pricing using straight lines between each quantity break. Furthermore, certain products are only available in multiples of a specific number. The pricing engine of the present invention will allow the user to optionally store a "stepping" value and, if this is set, then the user interface tools that customers use to specify the quantity will adhere to these stepping rules.

In order to implement the customer or buyer interface of the pricing engine of the present invention, a number of alternative user interface suggestions can be made. Referring now to FIGS. 7 through 10 in particular, each shows an exemplary screen display that are simple suggestions of how the pricing engines functionality will be presented to users through a web page or windows form. These are intended as examples of how the user interface ties into the functionality of the pricing engine of the present invention and, when used with the method and system of the present invention, each presents a novel user interface.

Figure 8:
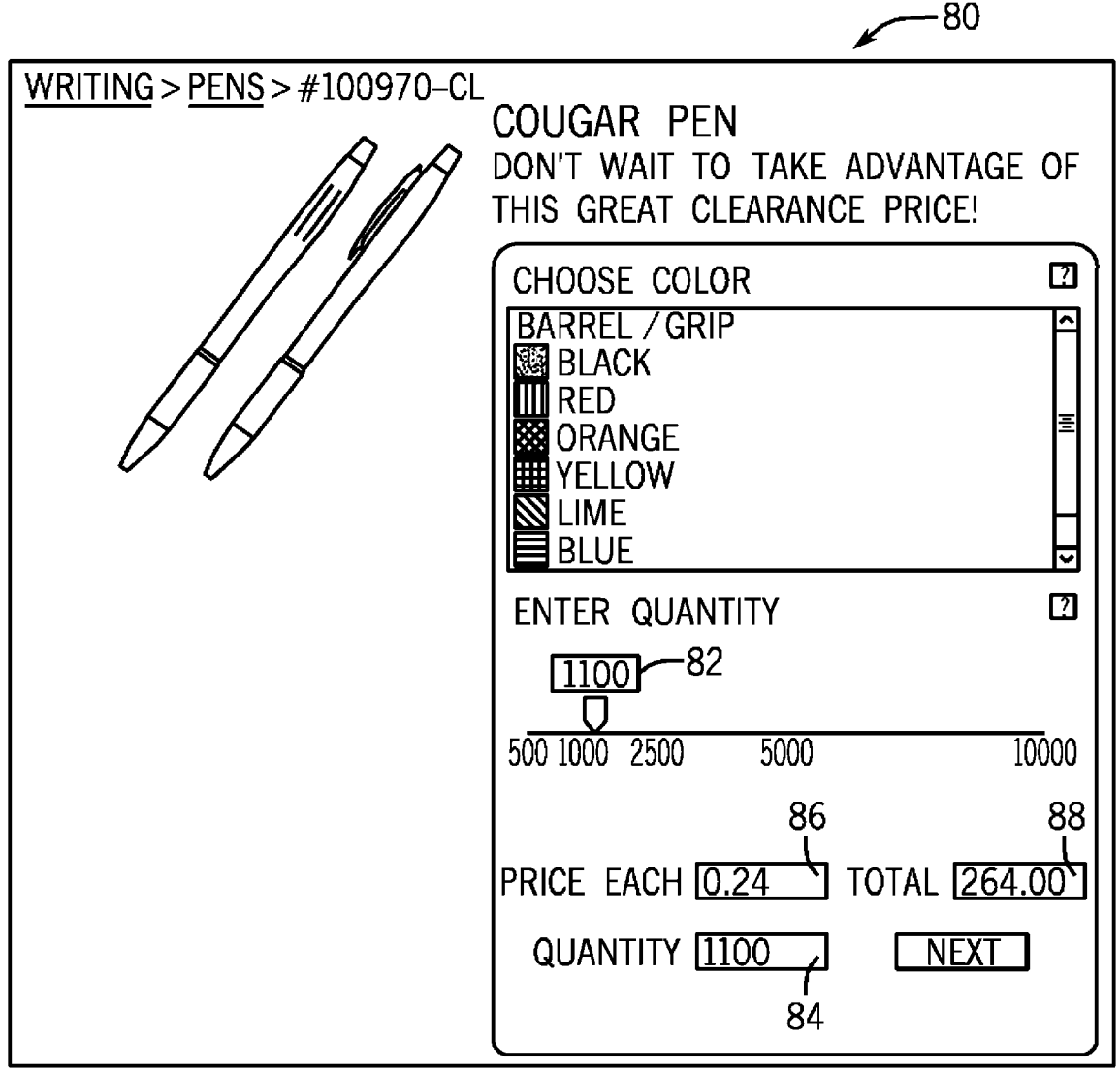
FIG. 8 is a suggested implementation of the user interface control that would be provided to the product buyer.

Referring first to FIG. 7, it illustrates a screen display (70) where the standard quantity break pricing is displayed (72) as normal, but a new "Need different quantities?" option (74) is now available to the user. Here the product detail page (70) continues to show the regular pricing across all quantity breaks (72). However, if the user clicks this new button (74), the regular pricing information and quantity selector will be replaced by the screen display (80) that is illustrated in FIG. 8. In FIG. 8, a user interface control (82) gives the user access to the pricing engine that is used in accordance with the method and system of the present invention. As the user slides the slider control (82) from left to right, the quantity field (84), the per unit price field (86) and total order amount field (88)

are each updated in real-time. The price per unit field (86) will be calculated from the pricing engine in accordance with the present invention.

Figure 9:
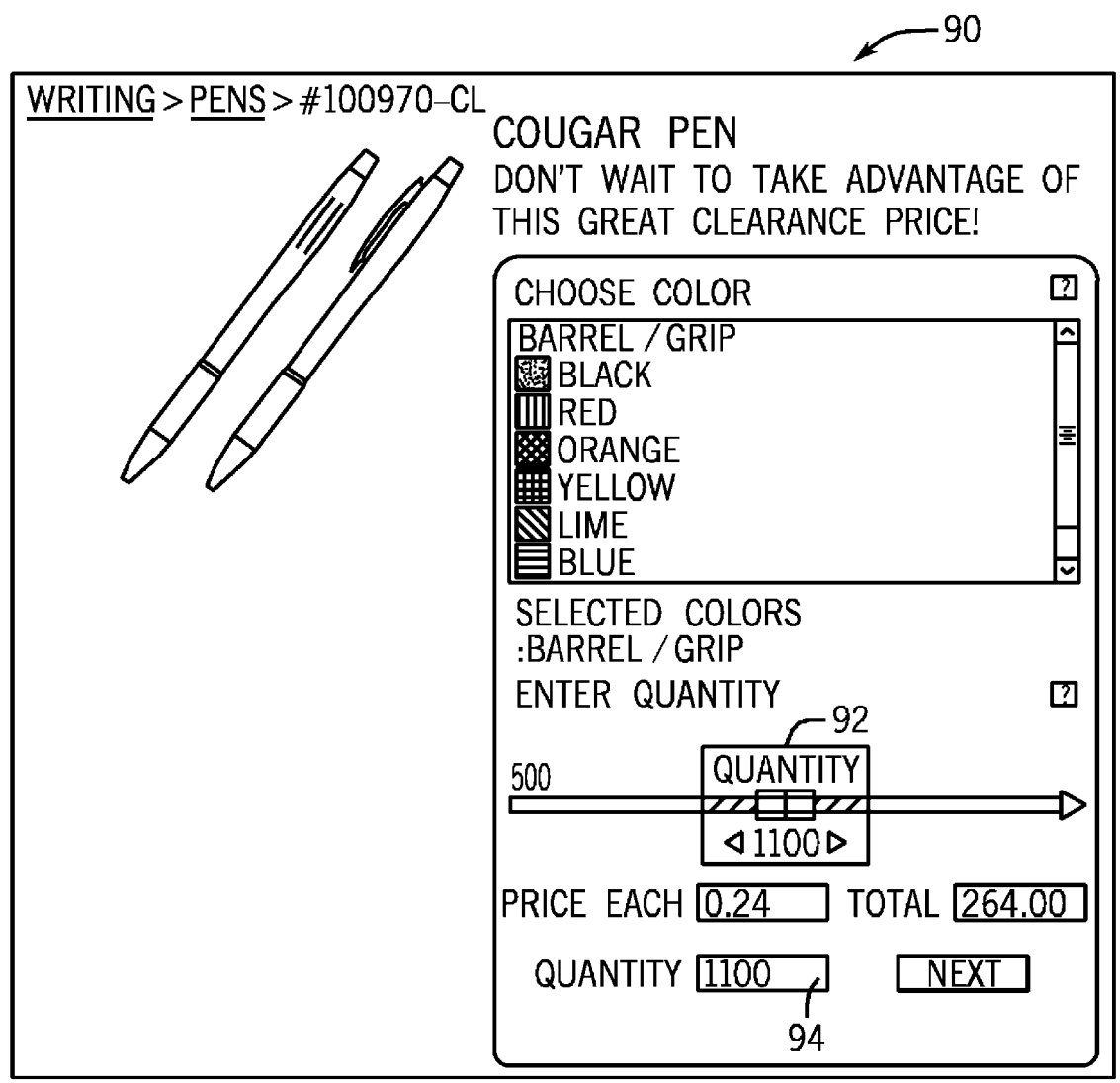
FIG. 9 is an alternative embodiment of the user interface illustration as compared to that shown in FIG. 8 but used in accordance with the present invention.

FIG. 9 illustrates another exemplary screen display (90) that shows an alternative user interface design where the control (92) is a spinner instead of a slider control (82). In this example, the user clicks anywhere on the quantity box (92) and then drags it either left or right. The quantity box (94) stays in the same place but the quantity shown in the bar behind the box (92) will scroll in and out of view.

Figure 10:
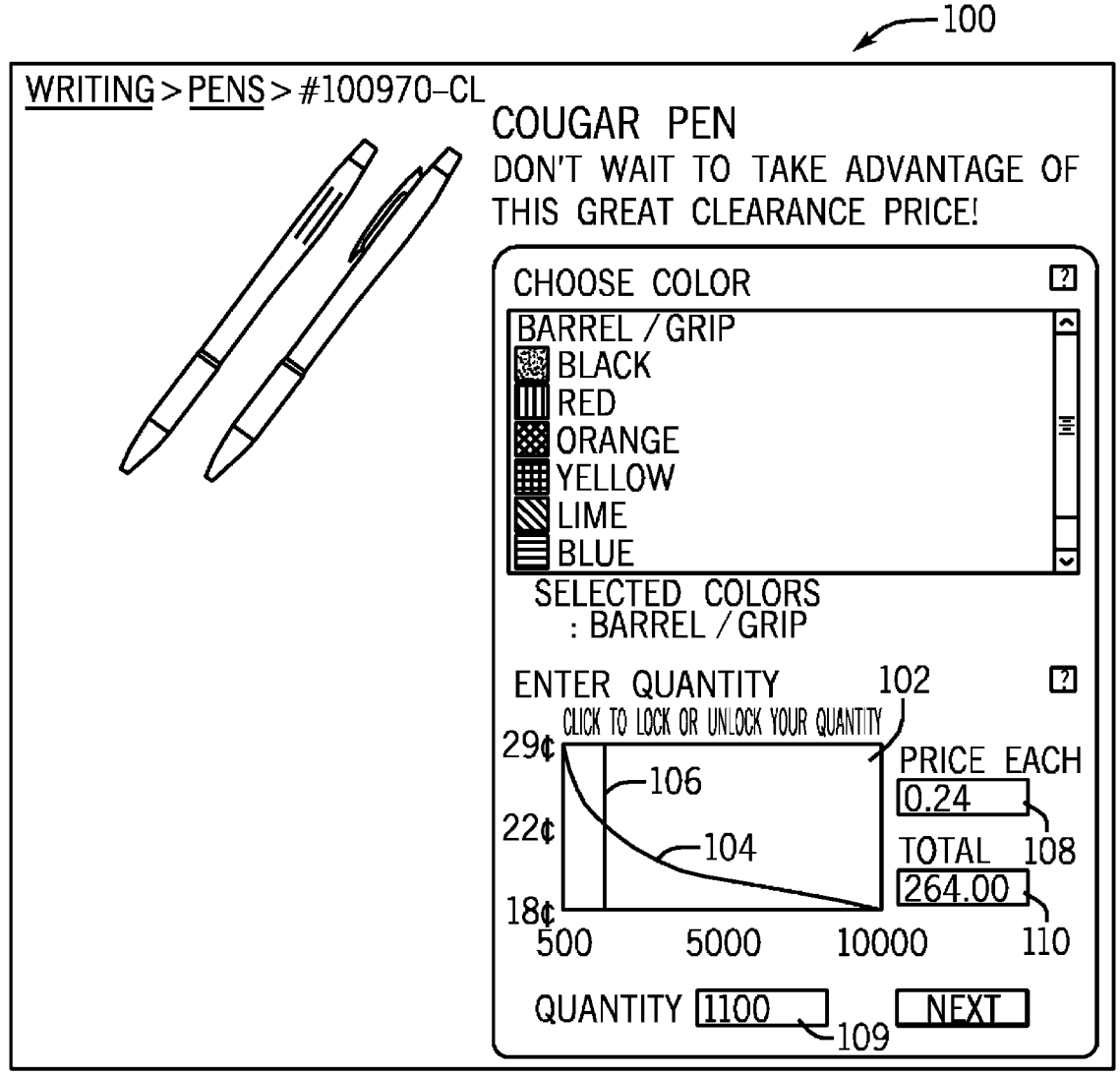
FIG. 10 is a second preferred embodiment of the user interface as compared to the screen shots shown in FIGS. 8 and 9.

FIG. 10 illustrates yet another exemplary screen display (100) that shows a user interface design where the pricing chart (102) for the product includes any adjustment curves (104) that have been set against the product. The user would receive a quick overview of pricing across all quantities as he or she moves around the chart (102). The pointer line (106) would move with the user's mouse, for example, to show where the user currently is within the chart (102). In addition, the price field (108) and the quantity field (109) would be updated in real-time. The user simply clicks in the chart (102) to select the current price and quantity combination level and can click again to unlock the selection. The total order amount field (110) would also be updated in real-time.

The adjustment curve feature discussed above allows the seller to optionally take the straight line between each price break and curve it up or down to influence the generated pricing. What is truly unique and innovative about the adjustment curve functionality is that the points that are plotted to define the curves are stored not as actual numeric quantities and price values, but as percentiles. As alluded to earlier, there are two values that need to be stored for each plot point. Those are the "quantity percentile" and the "price percentile." The "quantity percentile" represents how far along the quantity line between the start and end break the seller decides to go. To calculate the quantity percentile, the seller needs to work out the difference in quantities between the start price break and the end price break for the specific adjustment curve that is being plotted. The "price percentile" represents the amount of the difference between the start and end price break that will be used to discount the start price breaks price at the quantity level that was calculated in the quantity percentile. In accordance with the present invention, the seller will first need to calculate the difference in price between the start price break and the end price break for the adjustment curve that is being plotted.

This allows the adjustment curves to still be accurate even if the quantities and/or price values change in the official breaks, whereas, if the plots were stored as actual values rather than percentiles, the calculated price would be wrong as the shape of the curve would have changed and the values would need to be adjusted.

In accordance with the foregoing, it will be seen that there has been provided a new and useful method and system that allows the seller of products or services to offer variable pricing while still basing that pricing on the quantity selected by the buyer. The method, system and software product of the present invention provides the seller with the ability to adjust the per unit price of any given product or service along a calculated line that would exist between price breaks, much like the curve in a line chart.

A number of embodiments of the present invention have been described. However, it is to be understood that various modifications may be made without departing from the spirit and scope of the invention. For example, it will be obvious to one of ordinary skill to implement the system and method of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired. In any case, the language may be compiled or interpreted language. Suitable processors include both general and special purpose microprocessors. Furthermore, alternative embodiments that implement the system in hardware, firmware or a combination of hardware and software, as well as distributing modules and/or data in a different fashion will be apparent to those skilled in the art and are also within the scope of the invention. Computers and network access devices can include a processor, RAM and/or ROM memory, a display capability, an input device and hard disk or other relatively permanent storage capability. Accordingly, other embodiments are within the scope of the present invention.

The details of the invention having been disclosed in accordance with the foregoing, we claim:

1. A computer implemented method for variably pricing a product based on the volume of product sold comprising the steps of:
   electronically offering a product for sale to buyers;
   using the computer to define an adjustment curve for establishing pricing at a range of volumes for the product along such curve;
   allowing a user to define at least one plot point along such curve;
   using the computer to calculate and store a quantity percentile for such at least one plot point by establishing a start price break and an end price break and calculating the difference in quantities between the start price break and the end price break;
   using the computer to calculate and store a price percentile for such at least one plot point, the price percentile calculation step further comprising the step of calculating the difference in price between the start price break and the end price break at the quantity percentile that was calculated in the quantity percentile calculation step; and
   utilizing the adjustment curve to display the product pricing on a screen display operated electronically by a buyer via a website;
   wherein adjustment of either quantities or prices of one or both of the price breaks results in the automatic refreshing of the adjustment curve.

2. The method of claim 1 further comprising the step of visually displaying a quantity field, a per unit price field, a total order amount field and a slider control on the screen display such that the buyer can slide the slider control to update the quantity field, the per unit price field and the total order amount field in real time.

3. The method of claim 1 further comprising the step of visually displaying a quantity field, a per unit price field, a total order amount field and a spinner on the screen display such that the buyer can use the spinner to update the quantity field, the per unit price field and the total order amount field in real time.

4. The method of claim 1 further comprising the step of visually displaying a quantity field, a per unit price field, a total order amount field and a control on the screen display such that the buyer can operate the control to update the quantity field, the per unit price field and the total order amount field in real time.

5. A computer implemented method for calculating the price per unit of a user selected volume of product when the product is sold at differing discount levels at different volumes comprising the steps of:
- using a computer to generate at least one buyer interface, the interface comprising a buyer screen display;
- using the computer to provide at least one web page that displays a product for sale on the at least one buyer interface:
- allowing a user to select a volume;
- establishing a start price break, a first quantity percentile and first price percentile at a first volume and storing each of the start price break, first quantity percentile and first price percentile in the computer;
- establishing an end price break, a second quantity percentile and a second price percentile at a second volume and storing each of the end price break, second quantity percentile and second price percentile in the computer;
- using the computer to calculate the difference in quantities between the start price break and the end price break;
- using the computer to calculate and store a price percentile for at least one plot point by calculating the difference in price between the start price break and the end price break at the quantity percentile that was calculated in the quantity percentile calculation step; and
- utilizing the computer to generate an adjustment curve to display the product pricing on the buyer screen display.

6. The method of claim 5 further comprising the step of programming the computer to visually display a quantity field, a per unit price field, a total order amount field and a slider control on the screen display such that the buyer can slide the slider control to update the quantity field, the per unit price field and the total order amount field in real time.

7. The method of claim 5 further comprising the step of programming the computer to visually display a quantity field, a per unit price field, a total order amount field and a spinner on the screen display such that the buyer can use the spinner to update the quantity field, the per unit price field and the total order amount field in real time.

8. The method of claim 5 further comprising the step of programming the computer to visually display a quantity field, a per unit price field, a total order amount field and a control on the screen display such that the buyer can operate the control to update the quantity field, the per unit price field and the total order amount field in real time.

9. A computer program product for variably pricing a product based on the volume of the product sold, the computer program product being embodied in a non-transitory computer readable medium comprising computer instructions for:
- generating at least one buyer interface, the interface comprising a buyer screen display;
- providing at least one web page that displays a product for sale on the at least one buyer interface;
- allowing a user to select a volume;
- establishing a start price break, a first quantity percentile and first price percentile at a first volume and storing each of the start price break, first quantity percentile and first price percentile in the computer;
- establishing an end price break, a second quantity percentile and a second price percentile at a second volume and storing each of the end price break, second quantity percentile and second price percentile in the computer;
- calculating the difference in quantities between the start price break and the end price break;
- calculating and storing a price percentile for at least one plot point by calculating the difference in price between the start price break and the end price break at the quantity percentile that was calculated in the quantity percentile calculation step; and
- generating an adjustment curve to display the product pricing on the buyer screen display.

10. The computer program product of claim 9 further comprising computer instructions for visually displaying a quantity field, a per unit price field, a total order amount field and a slider control on a buyer's screen display such that the buyer can slide the slider control to update the quantity field, the per unit price field and the total order amount field in real time.

11. The computer program product of claim 9 further comprising computer instructions for visually displaying a quantity field, a per unit price field, a total order amount field and a spinner on the screen display such that the buyer can use the spinner to update the quantity field, the per unit price field and the total order amount field in real time.

12. The computer program product of claim 9 further comprising computer instructions for visually displaying a quantity field, a per unit price field, a total order amount field and a control on the screen display such that the buyer can operate the control to update the quantity field, the per unit price field and the total order amount field in real time.

* * * * *